United States Patent
Erickson

(10) Patent No.: US 8,667,555 B1
(45) Date of Patent: Mar. 4, 2014

(54) INTEGRITY PLUG-IN-PROXY

(75) Inventor: Steven Erickson, Newton, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1538 days.

(21) Appl. No.: 11/678,432

(22) Filed: Feb. 23, 2007

(51) Int. Cl.
*H04L 29/06* (2006.01)

(52) U.S. Cl.
USPC .................................. 726/1; 726/2; 713/168

(58) Field of Classification Search
USPC .......... 726/1, 3–5, 8, 27–30, 2; 713/155, 170, 713/168; 79/229
See application file for complete search history.

(56) References Cited

U.S. PATENT DOCUMENTS

| | | | |
|---|---|---|---|
| 2003/0055994 A1* | 3/2003 | Herrmann et al. | 709/229 |
| 2005/0097322 A1* | 5/2005 | Gustave et al. | 713/168 |
| 2006/0179472 A1* | 8/2006 | Chang et al. | 726/2 |
| 2006/0272011 A1* | 11/2006 | Ide et al. | 726/5 |

\* cited by examiner

*Primary Examiner* — Brandon Hoffman
*Assistant Examiner* — Thong Truong
(74) *Attorney, Agent, or Firm* — Harrity & Harrity, LLP

(57) ABSTRACT

A system receives user data associated with a user device and integrity policies associated with the user data, and distributes the user data and the integrity policies to one or more remote integrity servers. The system further receives integrity results from the one or more remote integrity servers based on the user data and the integrity policies, and collates the integrity results to formulate an access recommendation or a single integrity result for the user device.

31 Claims, 7 Drawing Sheets

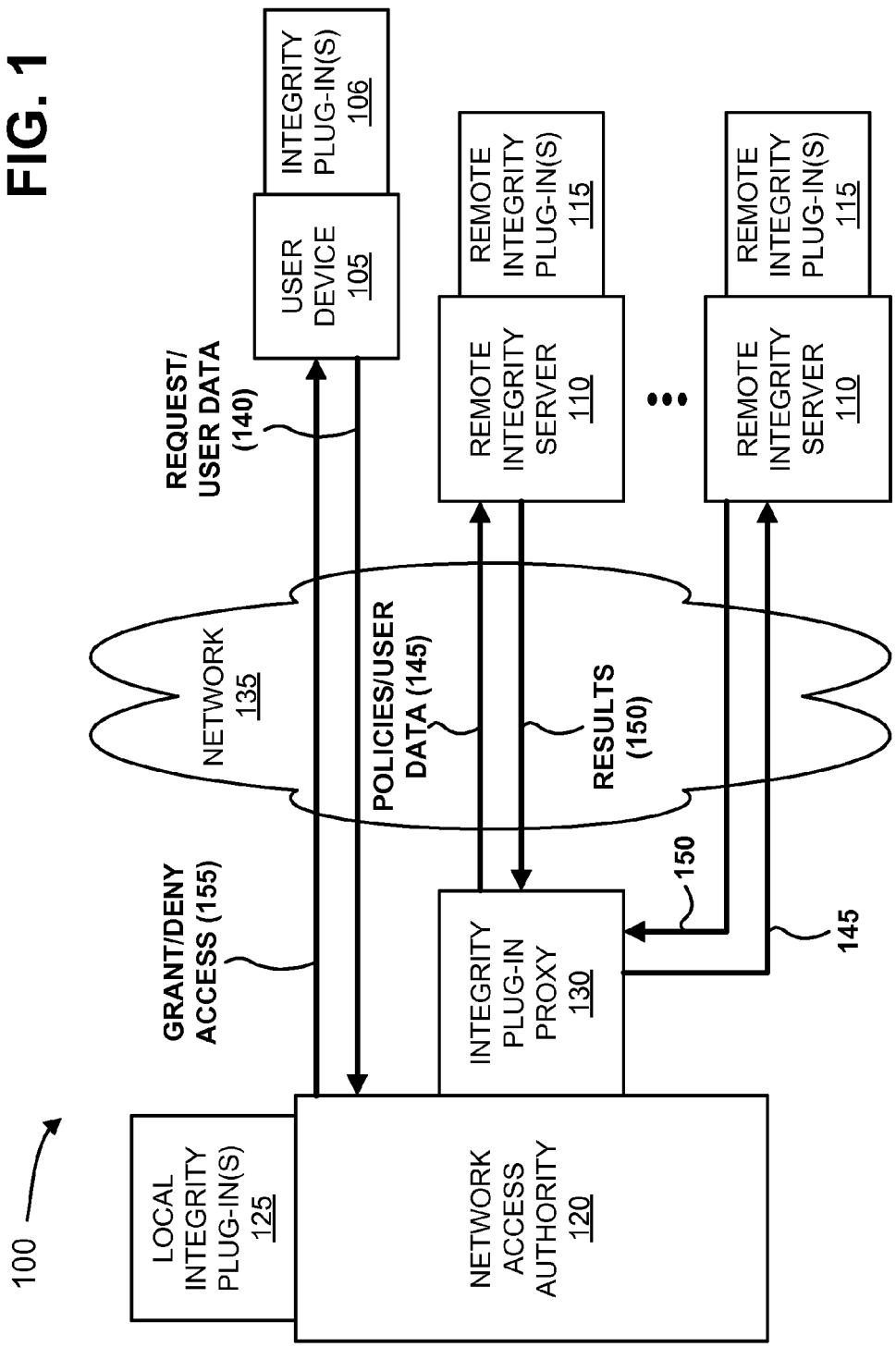

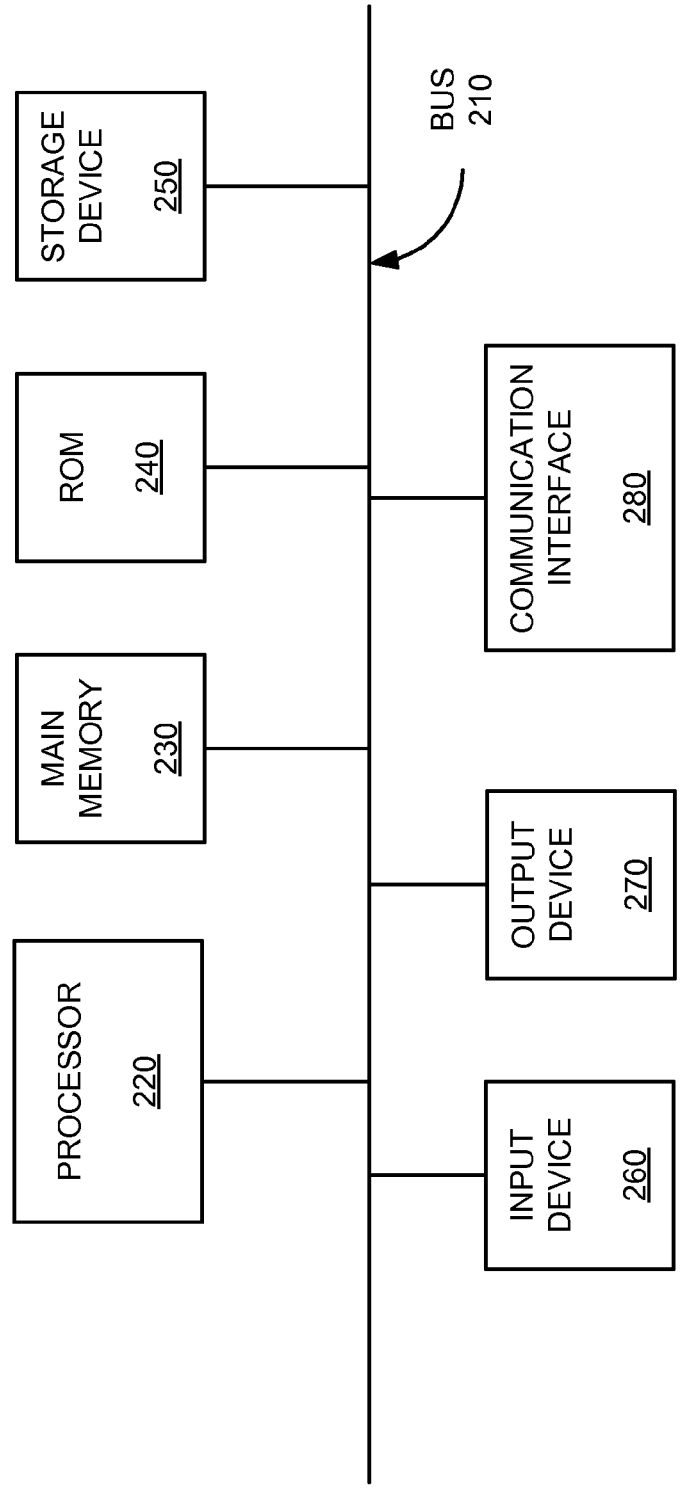

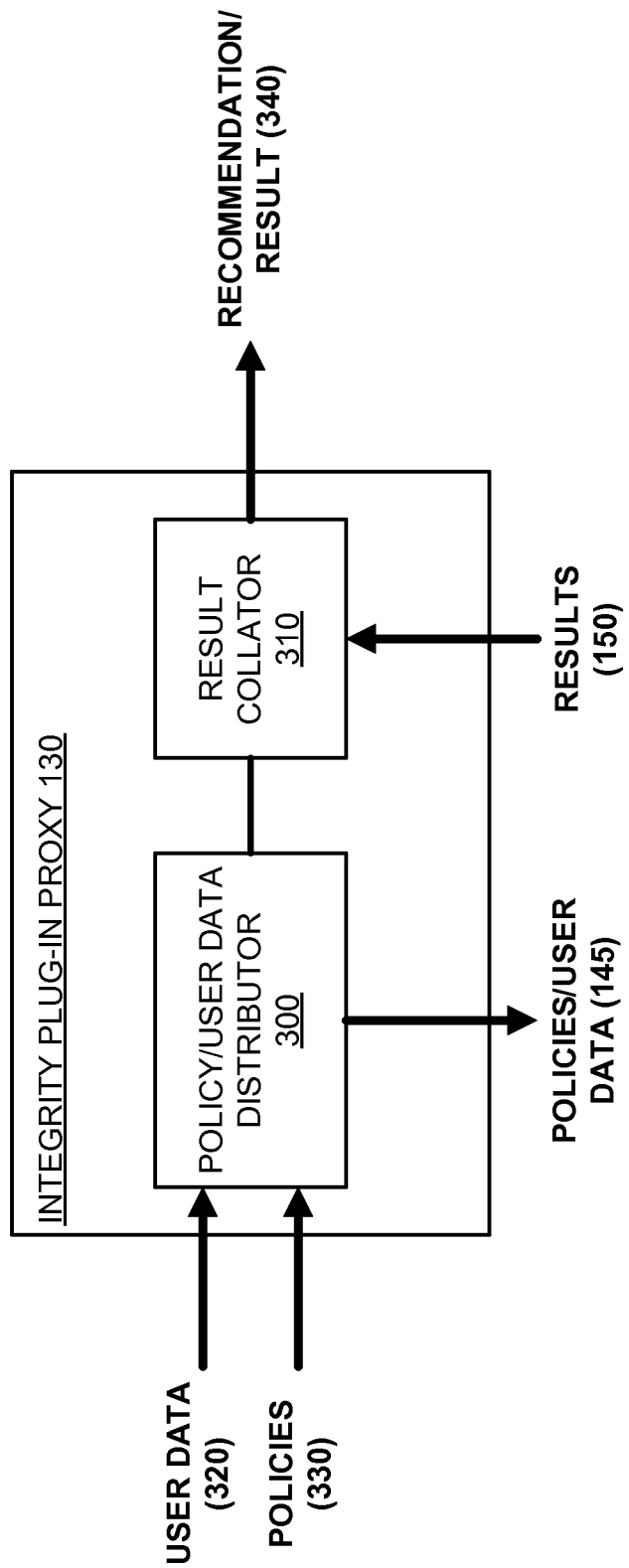

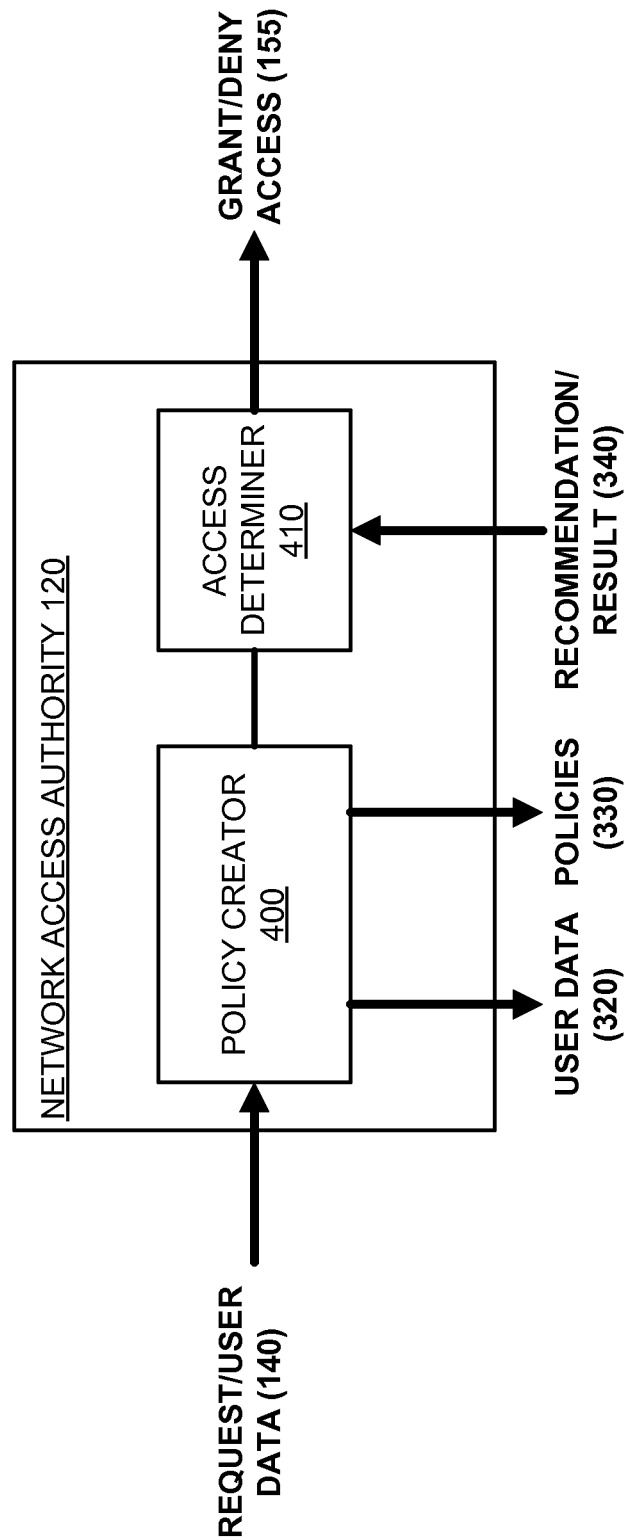

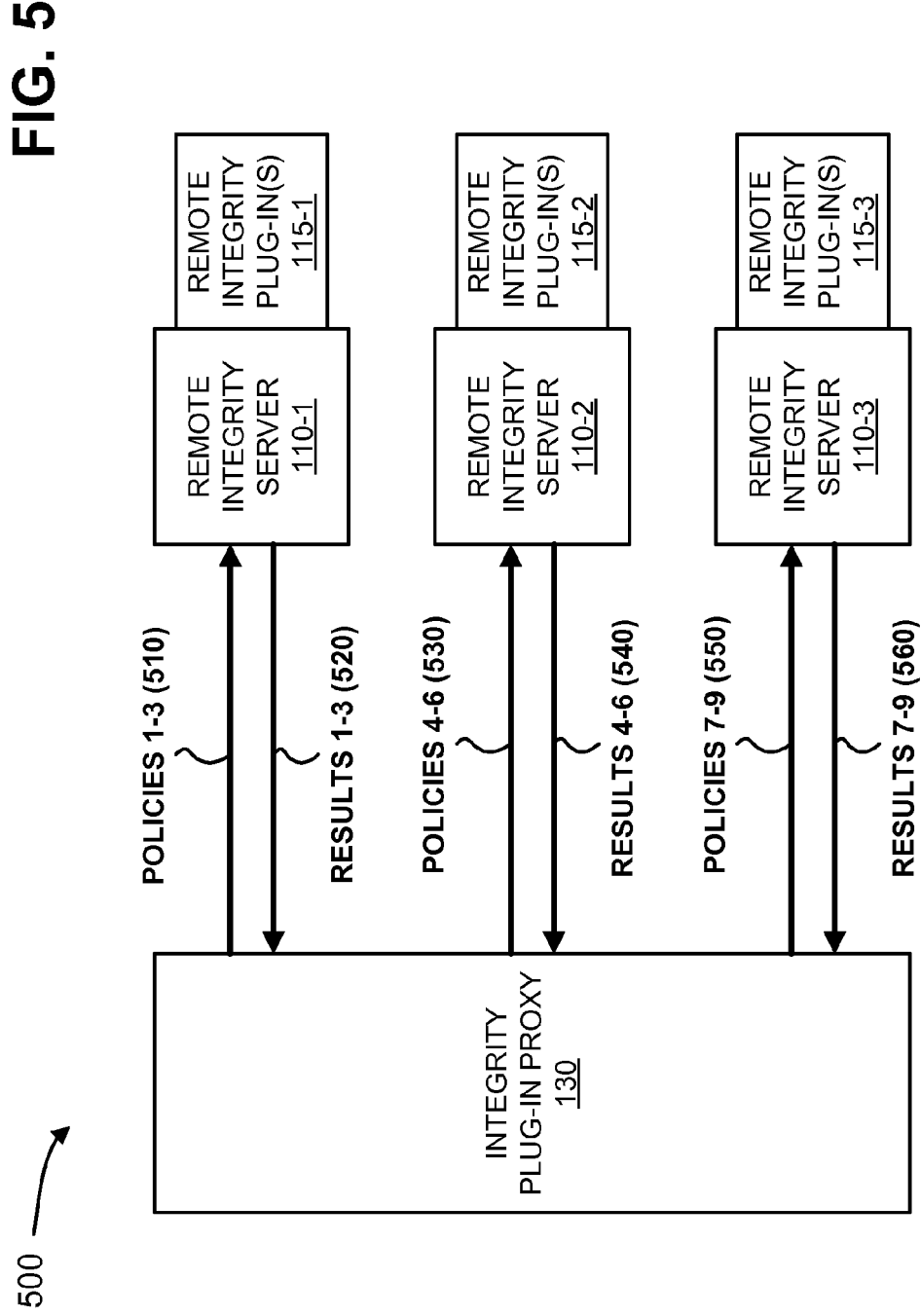

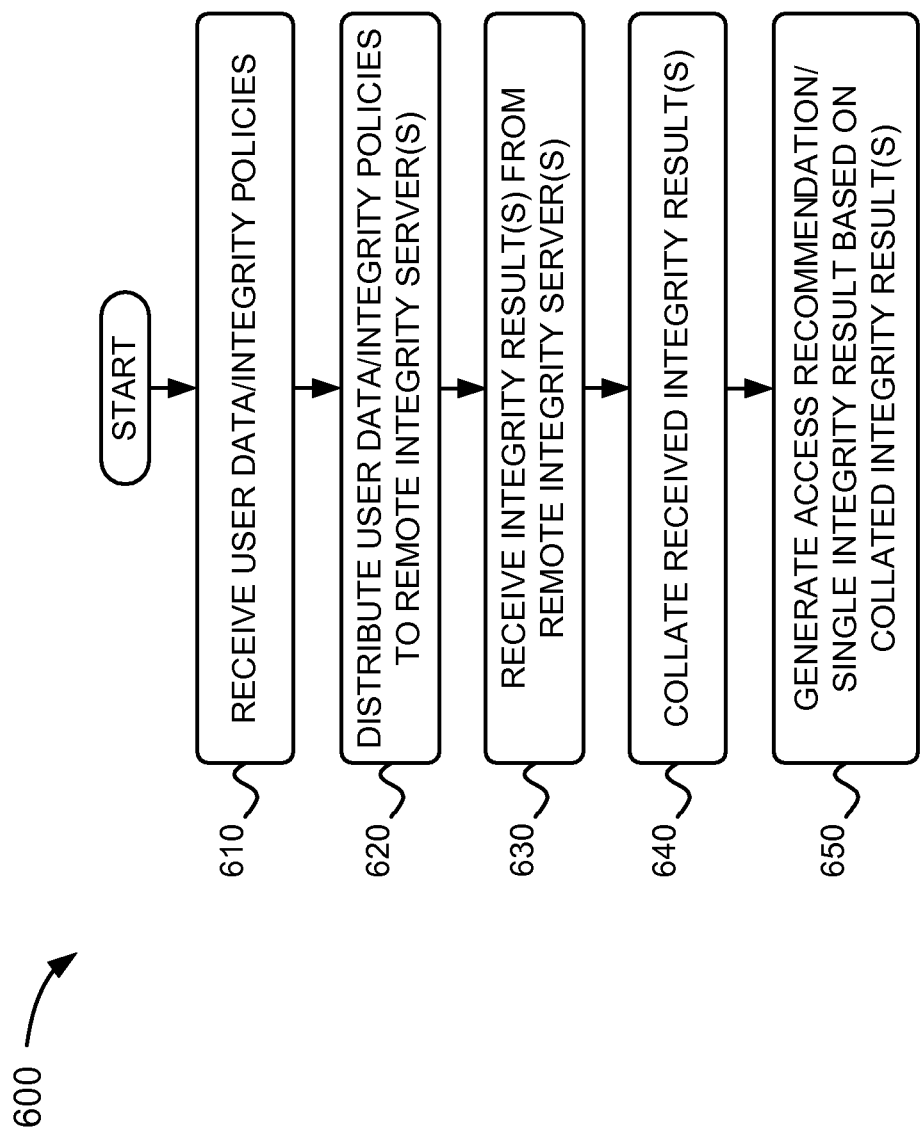

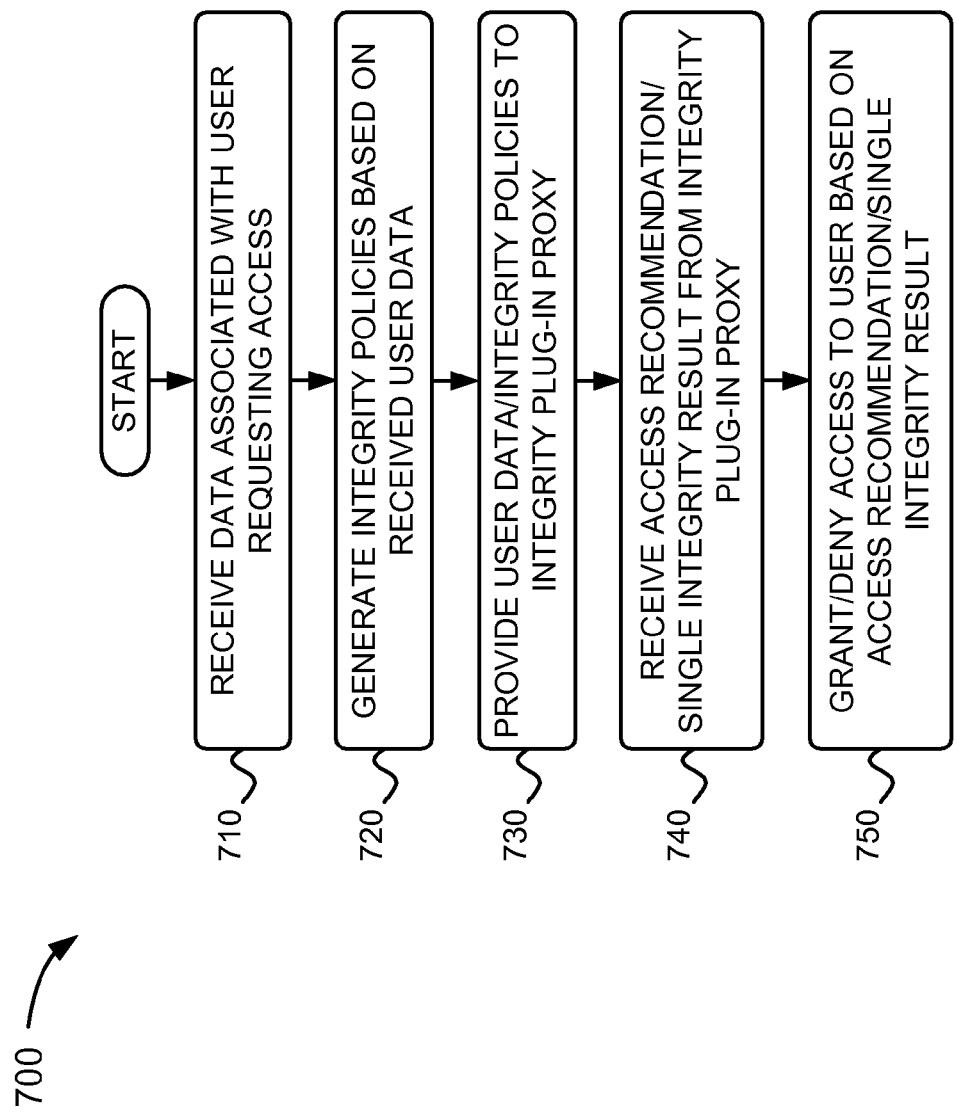

INTEGRITY PLUG-IN-PROXY

BACKGROUND

Organizations are continuously looking to prevent access to their internal networks from untrustworthy endpoints (e.g., unauthenticated devices connected to the networks). Traditionally, network access is provided by user authentication and/or authorization (e.g., via a user name and password). However, there has been a push in recent years to provide integrity checks of an endpoint before access is granted to a network, in addition to traditional user authentication and/or authorization. For example, before granting access, a network may wish to check if an endpoint's virus protection program is up-to-date, if the endpoint has downloaded the correct software patches, if the endpoint has any spyware or viruses present, etc.

Integrity plug-ins (e.g., a software program that may interact with an application to provide a predetermined function) may be provided on a network client or a user device, and may collect integrity data from the user device. Integrity plug-ins may be provided on a network server, and may verify the data collected by the user device integrity plug-ins if the user device attempts to connect to a network (e.g., to the network server). The combination of integrity plug-ins may be incorporated into a network policy that defines if the user device is granted or denied access to the network depending upon the results reported by the integrity plug-ins. Integrity plug-ins may further be provided on a third party server. However, the network server may not permit third party server integrity plug-ins to be loaded onto a network integrity server. Instead, the third party server integrity plug-ins may be loaded on remote integrity servers separate from the network.

SUMMARY

According to one aspect, a method may include receiving user data associated with a user device and one or more integrity policies associated with the user data, distributing the user data and the one or more integrity policies to one or more remote integrity servers, receiving one or more integrity results from the one or more remote integrity servers based on the user data and the one or more integrity policies, and collating the one or more integrity results to formulate at least one of an access recommendation or a single integrity result for the user device.

According to another aspect, a method may include receiving user data associated with a user device requesting access to a resource, generating one or more integrity policies based on the user data, and providing the user data and the one or more integrity policies to an integrity plug-in proxy. The integrity plug-in proxy may receive one or more integrity results from one or more remote integrity servers based on the user data and the one or more integrity policies, and may collate the one or more integrity results. The method may also include receiving an access recommendation or a single integrity result from the integrity plug-in proxy based on the collated integrity results, and granting or denying access to the user device based on the access recommendation or the single integrity result.

According to yet another aspect, a device may include a memory to store a plurality of instructions, and a processor to execute instructions in the memory. The processor may receive user data associated with a user device requesting access to a resource, receive one or more integrity policies associated with the user data, distribute the user data and the one or more integrity policies to one or more remote integrity servers, receive integrity results from the one or more remote integrity servers based on the user data and the one or more integrity policies, collate the integrity results, and formulate an access recommendation or a single integrity result for the user device based on the collated integrity results.

According to yet another aspect, a device may include a memory to store a plurality of instructions, and a processor to execute instructions in the memory. The processor may receive a request to access a resource from a user device, receive user data associated with the user device, generate one or more integrity policies based on the user data, and provide the user data and the one or more integrity policies to an integrity plug-in proxy. The integrity plug-in proxy may receive integrity results from one or more remote integrity servers based on the user data and the one or more integrity policies, and may collate the integrity results. The processor may also receive an access recommendation or a single integrity result from the integrity plug-in proxy based on the collated integrity results, and grant or deny access to the user device based on the access recommendation or the single integrity result.

According to still a further aspect, an integrity plug-in proxy may include a policy/user data distributor to receive user data associated with a user device requested access to a resource, receive integrity policies associated with the user data, and distribute the user data and the integrity policies to one or more remote integrity servers. The integrity plug-in proxy may also include a result collator to receive integrity results from the one or more remote integrity servers based on the user data and the integrity policies, collate the integrity results, formulate an access recommendation or a single integrity result for the user device based on the collated integrity results, and provide the access recommendation or the single integrity result to a network access authority.

According to still another aspect, a network access authority may include a policy creator to receive user information associated with a user device requesting access to a protected resource, generate integrity policies based on the user information, and provide the user information and the integrity policies to an integrity plug-in proxy. The integrity plug-in proxy may receive integrity results from one or more remote integrity servers based on the user information and the integrity policies, and may collate the integrity results. The network access authority may also include an access determiner to receive an access recommendation or a single integrity result from the integrity plug-in proxy based on the collated integrity results, and grant or deny the user device access to the protected resource based on the access recommendation or the single integrity result.

According to another aspect, a system may include means for receiving user data associated with a user device and integrity policies associated with the user data, means for distributing the user data and the integrity policies to remote integrity servers, means for receiving integrity results from the remote integrity servers based on the user data and the integrity policies, means for collating the integrity results to formulate an access recommendation or a single integrity result for the user device, and means for granting or denying access to the user device based on the access recommendation or the single integrity result.

BRIEF DESCRIPTION OF THE DRAWINGS

The accompanying drawings, which are incorporated in and constitute a part of this specification, illustrate implementations described herein and, together with the description, explain the implementations. In the drawings:

FIG. 1 is an exemplary diagram of a network in which systems and methods described herein may be implemented;

FIG. 2 is an exemplary block diagram of a device that may correspond to a user device, a remote integrity server, a network access authority, and/or an integrity plug-in proxy of FIG. 1;

FIG. 3 is an exemplary functional diagram of the integrity plug-in proxy of FIG. 1;

FIG. 4 is an exemplary functional diagram of the network access authority of FIG. 1;

FIG. 5 is a diagram showing exemplary integrity policy distribution between the integrity plug-in proxy and the remote integrity servers of FIG. 1; and FIGS. 6 and 7 depict flowcharts of exemplary processes according to implementations described herein.

DETAILED DESCRIPTION

The following detailed description refers to the accompanying drawings. The same reference numbers in different drawings may identify the same or similar elements. Also, the following detailed description does not limit the invention.

Overview

Implementations described herein may relate to systems and methods that assign integrity policies for evaluation to remote integrity servers, collate the results from the remote integrity servers, and provide an integrity recommendation and/or a single integrity result based on the collated results. For example, in one implementation, an integrity plug-in associated with a user device may collect integrity information and may provide this information to a network access authority when requesting access to a resource. The network access authority may identify integrity policies for analyzing the integrity information, and may provide the integrity policies to an integrity plug-in proxy associated with the network access authority. The integrity plug-in proxy may assign the integrity policies to one or more remote integrity servers. Remote integrity plug-ins associated with the remote integrity servers may check the integrity information against the integrity policies, and the remote integrity servers may provide results of the check to the integrity plug-in proxy. The integrity plug-in proxy may collate the results and may provide an integrity recommendation to the network access authority. Alternatively, the integrity plug-in proxy may provide the collated results as a single integrity result to the network access authority. The network access authority may grant or deny resource access to the user device based on the integrity recommendation and/or the single integrity result. The network access authority need not have knowledge of the remote integrity plug-ins, and may be able to interact with the remote integrity plug-ins through the integrity plug-in proxy.

"Integrity" or "endpoint integrity" as the terms are used herein, are to be broadly interpreted to include any functionality which examines an endpoint (e.g., a user device) attempting to access a resource and prohibits untrustworthy (e.g., unsafe or non-compliant) endpoints from accessing the resource. Endpoint integrity may ensure that an endpoint attaching to a network is trustworthy and meets configured criteria (e.g., antivirus program present and running with current signatures) before allowing the endpoint to connect to the network. If an endpoint attempts to connect to the network, the attempt may trigger a response from the endpoint integrity functionality, which may check to make sure that the endpoint meets certain entrance criteria before allowing the endpoint to access the resource. If the endpoint meets the criteria, the endpoint may be granted appropriate access to the resource. If the endpoint does not meet the criteria, the endpoint may be either denied access to the resource or placed into a quarantine or remediation area. For example, integrity or endpoint integrity may include checking if an endpoint's virus protection program is up-to-date and/or running with current signatures, checking if the endpoint has downloaded the correct software patches, checking endpoint compliance with respect to operating system versions and/or any other programs that may be required or forbidden by a network, checking if the endpoint has any spyware or viruses present, etc.

An "integrity plug-in," as the term is used herein, is to be broadly interpreted to include any functionality that collects endpoint integrity data, verifies the endpoint integrity data if the endpoint attempts to access a resource, and/or provides other functions with respect to authenticating the endpoint.

A "resource," as the term is used herein, is to be broadly interpreted to include any network, device, application, and/or combinations of networks, devices, and/or applications.

Exemplary Network

FIG. 1 is an exemplary diagram of a network 100 in which systems and methods described herein may be implemented. Network 100 may include a client or user device 105, one or more remote integrity servers 110 associated with corresponding remote integrity plug-ins 115, and/or a network access authority 120 associated with a local integrity plug-in 125 and an integrity plug-in proxy 130, interconnected via a network 135. Network 135 may include a local area network (LAN), a wide area network (WAN), a metropolitan area network (MAN), a telephone network, such as the Public Switched Telephone Network (PSTN) or a cellular network, an intranet, the Internet, or a combination of networks.

User device 105, remote integrity servers 110, and network access authority 120 may connect to network 135 via wired, wireless, and/or optical connections. A single user device 105, two remote integrity servers 110, and a single network access authority 120 have been illustrated in FIG. 1 for simplicity. In practice, there may be more or fewer user devices 105, remote integrity servers 110, and/or network access authority 120. Also, in some instances, user device 110 may perform one or more functions of remote integrity server 110, and/or remote integrity server 110 may perform one or more functions of user device 105. In other instances, network access authority 120 may perform one or more functions of remote integrity server 110, and/or remote integrity server 110 may perform one or more functions of network access authority 120.

Although FIG. 1 shows exemplary components of network 100, in other implementations, network 100 may contain fewer, different, or additional components than depicted in FIG. 1. In still other implementations, one or more components of network 100 may perform the tasks performed by one or more other components of network 100. For example, although local integrity plug-in 125 and integrity plug-in proxy 130 are shown as distinct components, in other implementations, local integrity plug-in 125 and/or integrity plug-in proxy 130 may be incorporated into network access authority 120. In other examples, more than one local integrity plug-in 125 may be associated with network access authority 120, more than one integrity plug-in 106 may be associated with user device 105, and more than one remote integrity plug-in 115 may be associated with each remote integrity server 110.

User device 105 may include a device, such as a personal computer, a wireless telephone, a personal digital assistant (PDA), a laptop, or another type of computation or communication device, a thread or process running on one of these devices, and/or an object executable by one of these devices. In one implementation, user device 105 may include one or more corresponding integrity plug-ins 106 that may collect integrity data from user device 105.

Each remote integrity server 110 may include a server, or a set of servers, that contain integrity policies or policy information received from network access authority 120 (e.g., via integrity plug-in proxy 130), check integrity information (e.g., user data received from user device 105) against the integrity policies, and provide results of the check to integrity plug-in proxy 130. Integrity policies may include, for example, a condition for a user/application system (e.g., user device 105) to access a resource protected by network access authority 120. Integrity policies may include rules that examine an endpoint (e.g., user device 105) attempting to access a resource (e.g., attempting to connect to a network protected by network access authority 120) and prohibit unsafe or non-compliant endpoints from accessing the resource. In one implementation, each integrity server 110 may include one or more corresponding remote integrity plug-ins 115 that checks integrity information against the integrity policies. In other implementations, each remote integrity server 110 may include integrity policies in addition to the integrity policies received from network access authority 120 (via integrity plug-in proxy 130). In still other implementations, each remote integrity server 110 may provide an integrity recommendation, in addition to the integrity results, to integrity plug-in proxy 130.

Network access authority 120 may include a server, or a set of servers, that contain integrity policies, provide authentication services (e.g., for user device 105), provide integrity checks (e.g., of user device 105), provide access control (e.g., to a resource protected by network access authority 120), etc. In one implementation, network access authority 120 may identify the integrity policies for analyzing the integrity information (e.g., received from user device 105), and may provide the integrity policies to integrity plug-in proxy 130. In other implementations, network access authority 120 may include one or more corresponding local integrity plug-ins 125 that checks integrity information of devices within the network protected by network access authority 120 against the policy information. In still other implementations, network access authority 120 may not provide authentication services, but rather authentication services may be provided by a separate authentication server (not shown) which may or may not communicate with network access authority 120. Additional details of network access authority 120 are provided below in connection with FIG. 4.

Integrity plug-in proxy 130 may include hardware and/or software associated with network access authority 120. Integrity plug-in proxy 130 may receive the integrity policies from network access authority 120, and may assign the integrity policies to one or more remote integrity servers 110. Integrity plug-in proxy 130 may receive the results of integrity checks from remote integrity servers 110, may collate the results, and may provide an integrity recommendation to network access authority 120. Alternatively and/or additionally, integrity plug-in proxy 130 may provide the collated results as a single integrity result to network access authority 120. Integrity plug-in proxy 130 may thus manage remote integrity plug-ins 115 associated with remote integrity servers 110. Network access authority 120 need not have knowledge of remote integrity plug-ins 115, and may be able to interact with remote integrity plug-ins 115 through integrity plug-in proxy 130, as though integrity plug-in proxy 130 was a single integrity plug-in. Network access authority 120 may grant or deny resource access to user device 105 based on the integrity recommendation and/or the single integrity result. Additional details of integrity plug-in proxy 130 are provided below in connection with FIGS. 3 and 5.

As further shown in FIG. 1, in an exemplary operation, user device 105 may provide a request to access a resource protected by network access authority 120, and/or user data associated with user device 105 to network access authority 120, as indicated by reference number 140. The user data may include integrity information associated with user device 105 that may be collected by one or more integrity plug-ins associated with user device 105. Network access authority 120 may identify integrity policies for analyzing the integrity information (e.g., user data 140), and may provide the integrity policies to integrity plug-in proxy 130. Integrity plug-in proxy 130 may assign the integrity policies to one or more remote integrity servers 110. For example, integrity plug-in proxy 130 may provide a first set of integrity policies and user data associated with the first set of integrity policies to one remote integrity server 110, and may provide a second set of integrity policies and user data associated with the second set of integrity policies to another remote integrity server 110, as indicated by reference number 145.

Remote integrity plug-ins 115 associated with remote integrity servers 110 may check the integrity information (e.g., user data 140) against the integrity policies, and remote integrity servers 110 may provide integrity results 150 (e.g., of the check) to integrity plug-in proxy 130. Integrity plug-in proxy 130 may collate the results and provide one or more integrity recommendations to network access authority 120. Alternatively, integrity plug-in proxy 130 may provide the results as one or more integrity results to network access authority 120. Network access authority 120 may grant or deny resource access to user device 105 based on the integrity recommendation(s) or based on the integrity result(s), as indicated by reference number 155.

Although the exemplary operation of FIG. 1 shows a single request/user data 140, in other implementations, multiple cycles of user data 140, integrity policies 145, and integrity results 150 may be generated. For example, integrity plug-in proxy 130 may collate the results and provide the collated results to network access authority 120, and, based on the collated results, network access authority 120 may request additional information from user device 105 and/or may generate additional integrity policies that may be different than integrity policies 145. User device 105 may provide the additional information, and network access authority 120 and integrity plug-in proxy 130 may continue the integrity policy generation and result determination process as many times as needed. If network access authority 120 does not require additional information from user device 105 and remote integrity servers 110 have provided the requested integrity results 150, integrity plug-in proxy 130 may collate the received integrity results 150 and may provide one or more recommendations/results to network access authority 120.

In one implementation, integrity plug-in proxy 130 may wait until all integrity results 150 are received from remote integrity servers 110 before providing a recommendation/result to network access authority 120. In other implementations, if integrity plug-in proxy 130 does not receive integrity results from a particular remote integrity server 110, integrity plug-in proxy 130 may provide a recommendation/result to network access authority 120 based on the received integrity results. In still other implementations, integrity plug-in proxy 130 may provide a recommendation/result for a single integrity policy once the integrity results related to the single integrity policy are received from one or more remote integrity servers 110. In other words, integrity plug-in proxy 130 need not wait for receipt of all integrity results before it provides the recommendation/result for a single integrity policy whose integrity results have been received.

In another implementation, a set of integrity policies may be associated with user device 105 if user device 105 attempts to access network resources. There may be multiple rounds of data collected from user device 105 and delivered to remote integrity servers 110 to determine the integrity results for each of the integrity policies.

Exemplary Device Architecture

FIG. 2 is an exemplary block diagram of a device, which may correspond to user device 105, a single remote integrity server 110, network access authority 120, and/or integrity plug-in proxy 130. The device may include a bus 210, a processor 220, a main memory 230, a read only memory (ROM) 240, a storage device 250, an input device 260, an output device 270, and a communication interface 280. Bus 210 may include a path that permits communication among the elements of the device.

Processor 220 may include a processor, microprocessor, or processing logic that may interpret and execute instructions. Main memory 230 may include a random access memory (RAM) or another type of dynamic storage device that may store information and instructions for execution by processor 220. ROM 240 may include a ROM device or another type of static storage device that may store static information and instructions for use by processor 220. Storage device 250 may include a magnetic and/or optical recording medium and its corresponding drive.

Input device 260 may include a mechanism that permits an operator to input information to the device, such as a keyboard, a mouse, a pen, voice recognition and/or biometric mechanisms, etc. Output device 270 may include a mechanism that outputs information to the operator, including a display, a printer, a speaker, etc. Communication interface 280 may include any transceiver-like mechanism that enables the device to communicate with other devices and/or systems.

As will be described in detail below, the device may perform certain operations. The device may perform these operations in response to processor 220 executing software instructions contained in a computer-readable medium, such as memory 230. A computer-readable medium may be defined as a physical or logical memory device and/or carrier wave.

The software instructions may be read into memory 230 from another computer-readable medium, such as data storage device 250, or from another device via communication interface 280. The software instructions contained in memory 230 may cause processor 220 to perform processes that will be described later. Alternatively, hardwired circuitry may be used in place of or in combination with software instructions to implement processes described herein. Thus, implementations described herein are not limited to any specific combination of hardware circuitry and software.

Although FIG. 2 shows exemplary elements of the device, in other implementations, the device may contain fewer, different or additional elements. In still other implementations, one or more elements of the device may perform the tasks performed by other elements of the device.

Exemplary Integrity Plug-in Proxy

FIG. 3 is an exemplary functional diagram of integrity plug-in proxy 130. As shown, integrity plug-in proxy 130 may include a variety of components, including, e.g., a policy/user data distributor 300, and a result collator 310.

Policy/user data distributor 300 may receive user data 320 and/or integrity policies 330 associated with user data 320 from network access authority 120. In one implementation, user data 320 may include integrity information associated with user device 105 that may be collected by one or more integrity plug-ins associated with user device 105. In other implementations, user data 320 may include other information associated with user device, such as, e.g., authentication information. Integrity policies 330 may include policies for analyzing the integrity information (e.g., user data 320), as identified by network access authority 120. In one implementation, integrity policies 330 may include, for example, a condition for user device 105 to access a resource protected by network access authority 120. In other implementations, integrity policies 330 may include rules that examine user device 105 (e.g., if user device 105 attempts to connect to a network protected by network access authority 120), and prohibit unsafe or non-compliant user devices from accessing the resource. Policy/user data distributor 300 may distribute policies/user data 145 to one or more remote integrity servers 110. Additional details of distribution of policies/user data 145 is provided below in connection with FIG. 5.

Result collator 310 may receive (e.g., from remote integrity plug-ins 115) integrity results 150 of a check of the integrity information (e.g., user data 140) against the integrity policies. Result collator 310 may collate integrity results 150 and may generate a recommendation/result 340 to be provided to network access authority 120 based on integrity results 150. In one implementation, recommendation/result 340 may include an integrity recommendation that network access authority 120 may use to determine whether to grant or deny access to user device 105. In other implementations, recommendation/result 340 may include a single integrity result (e.g., incorporating integrity results 150) that network access authority 120 may use to determine whether to grant or deny access to user device 105.

Although FIG. 3 shows exemplary components of integrity plug-in proxy 130, in other implementations, integrity plug-in proxy 130 may contain fewer, different or additional components. In still other implementations, one or more components of integrity plug-in proxy 130 may perform the tasks performed by other components of integrity plug-in proxy 130.

Exemplary Network Access Authority

FIG. 4 is an exemplary functional diagram of network access authority 120. As shown, network access authority 120 may include a variety of components, including, e.g., a policy creator 400, and an access determiner 410.

Policy creator 400 may receive request/user data 140 (e.g., from user device 105) requesting access to a resource protected by network access authority 120, and may generate user data 320 and/or integrity policies 330 associated with user data 320. Policy creator 400 may provide user data 320 and/or integrity policies 330 to integrity plug-in proxy 130, and integrity plug-in proxy 130 may manage distribution of user data 320 and/or integrity policies 330 to remote integrity servers 110. Policy creator 400 may create a variety of integrity policies 330. For example, in one implementation, policy creator 400 may create a first set of one or more integrity policies 330 regarding resource access, which may be provided to a first remote integrity plug-in 115 associated with a first remote integrity server 110, via integrity plug-in proxy 130. Policy creator 400 may create a second set one or more integrity policies 330 regarding resource access, which may be provided to a second remote integrity plug-in 115 associated with a second remote integrity server 110, via integrity plug-in proxy 130. Policy creator 400 may further create, for example, an overall integrity policy that may grant resource access if the first and second sets of integrity policies 330 are achieved. In other implementations, policy creator 400 may create fewer, different, or additional integrity policies and/or combinations of integrity policies in a variety of ways in order to determine whether to grant or deny access to an endpoint (e.g., user device 105).

Access determiner 410 may receive recommendation/result 340 from integrity plug-in proxy 130, and may use recommendation/result 340 to determine whether to grant or deny access to an endpoint (e.g., user device 105). For example, in one implementation, access determiner 410 may use an integrity recommendation provided by recommendation/result 340 to determine whether to grant or deny access to user device 105. In other implementations, access determiner 410 may use a single integrity result (e.g., incorporating integrity results 150) provided by recommendation/result 340 to determine whether to grant or deny access to user device 105. Access determiner 410 may provide signal 155 (e.g., based on the integrity recommendation or the single integrity result) to user device 105 indicating whether resource access is granted or denied for user device 105.

Although FIG. 4 shows exemplary components of network access authority 120, in other implementations, network access authority 120 may contain fewer, different or additional components. In still other implementations, one or more components of network access authority 120 may perform the tasks performed by other components of network access authority 120.

Exemplary Integrity Policy Distribution

There are a number of ways to implement the systems and methods described herein. FIG. 5 is a diagram showing exemplary integrity policy distribution between integrity plug-in proxy 130 and remote integrity servers 110 in a portion 500 of network 100. Other portions of network 100 (e.g., network access authority 120 and network 140) have been omitted from FIG. 5 for clarity. As shown, integrity plug-in proxy 130 may interact with three remote integrity servers 110-1, 110-2, and 110-3 associated with corresponding remote integrity plug-ins 115-1, 115-2, and 115-3, respectively. For example, network access authority 120 (not shown) may have defined nine integrity policies (e.g., "policies 1-9") to check for an endpoint (e.g., user device 105), and may provide the nine integrity policies to integrity plug-in proxy 130. Integrity plug-in proxy 130 may distribute or assign the nine integrity policies to a variety of remote integrity servers 110. For example, in one implementation, integrity plug-in proxy 130 may distribute the nine integrity policies to a single remote integrity server 110. In other implementations, integrity plug-in proxy 130 may distribute one or more of the nine integrity policies to a first remote integrity server 110, one or more of the remaining nine integrity policies to a second remote integrity server 110, etc.

As shown in the exemplary implementation of FIG. 5, integrity plug-in proxy 130 may distribute integrity policies 510 (e.g., "policies 1-3") and any corresponding user data (not shown) to remote integrity server 110-1. Remote integrity plug-in 115-1 of remote integrity server 110-1 may check integrity policies 510, and remote integrity server 110-1 may provide results 520 (e.g., "results 1-3") of the check to integrity plug-in proxy 130. Integrity plug-in proxy 130 may distribute integrity policies 530 (e.g., "policies 4-6") and any corresponding user data (not shown) to remote integrity server 110-2. Remote integrity plug-in 115-2 of remote integrity server 110-2 may check integrity policies 530, and remote integrity server 110-2 may provide results 540 (e.g., "results 4-6") of the check to integrity plug-in proxy 130. Integrity plug-in proxy 130 may distribute integrity policies 550 (e.g., "policies 7-9") and any corresponding user data (not shown) to remote integrity server 110-3. Remote integrity plug-in 115-3 of remote integrity server 110-3 may check integrity policies 550, and remote integrity server 110-3 may provide results 560 (e.g., "results 7-9") of the check to integrity plug-in proxy 130. Integrity plug-in proxy 130 may collate results 520, 540, and 560 for the nine integrity policies, and may provide an integrity recommendation and/or a single integrity result (e.g., incorporating results 520, 540, and 560) that network access authority 120 may use to determine whether to grant or deny access to user device 105.

Integrity plug-in proxy 130 may distribute integrity policies to remote integrity servers 110 based on the integrity policies and/or the function(s) performed by remote integrity servers 110. For example, if a first remote integrity server 110 includes remote integrity plug-in 115 that determines if virus protection software is up-to-date, integrity plug-in proxy 130 may distribute an integrity policy related to the virus protection software to the first remote integrity server 110. In another example, if a second remote integrity server 110 includes remote integrity plug-in 115 that determines if a software patch is present, integrity plug-in proxy 130 may distribute an integrity policy related to the software patch to the second remote integrity server 110.

Although not shown in FIG. 5, integrity plug-in proxy 130 may collate results 520, 540, and 560 for the nine integrity policies, and may provide more than one integrity recommendation and/or more than one integrity result (e.g., incorporating results 520, 540, and 560) that network access authority 120 may use to determine whether to grant or deny access to user device 105.

Exemplary Processes

FIG. 6 depicts a flowchart of an exemplary process 600 capable of being performed by integrity plug-in proxy 130. As shown, process 600 may begin with receipt of user data and/or integrity policies associated with the user data by an integrity plug-in proxy (block 610). For example, in one implementation described above in connection with FIG. 3, policy/user data distributor 300 of integrity plug-in proxy 130 may receive user data 320 and/or integrity policies 330 associated with user data 320 from network access authority 120. User data 320 may include integrity information associated with user device 105 that may be collected by one or more integrity plug-ins associated with user device 105. Integrity policies 330 may include policies for analyzing the integrity information (e.g., user data 320), as identified by network access authority 120. Integrity policies 330 may include, for example, a condition for user device 105 to access a resource protected by network access authority 120.

Process 600 may continue with the distribution of the user data and/or integrity policies by the integrity plug-in proxy to one or more remote integrity servers (block 620). For example, in one implementation described above in connection with FIG. 3, policy/user data distributor 300 may distribute policies/user data 145 to one or more remote integrity servers 110. In another implementation described above in connection with FIG. 5, integrity plug-in proxy 130 may distribute one or more integrity policies to a first remote integrity server 110, one or more of the remaining integrity policies to a second remote integrity server 110, etc.

As further shown in FIG. 6, the integrity plug-in proxy may receive one or more integrity results from the remote integrity servers (block 630), and may collate the received integrity result(s) (block 640). For example, in one implementation described above in connection with FIG. 3, result collator 310 of integrity plug-in proxy 130 may receive (e.g., from remote integrity plug-ins 115 associated with remote integrity servers 110) integrity results 150 of a check of the integrity information (e.g., user data 140) against the integrity policies. Result collator 310 may collate integrity results 150 in order formulate an access recommendation and/or a single integrity result.

The integrity plug-in proxy may generate an access recommendation or a single integrity result based on the collated integrity results (block 650). For example, in one implementation described above in connection with FIG. 3, result collator 310 may generate a recommendation/result 340 to be provided to network access authority 120 based on integrity results 150. Recommendation/result 340 may include an integrity recommendation or a single integrity result (e.g., incorporating integrity results 150) that network access authority 120 may use to determine whether to grant or deny access to user device 105. In another implementation described above in connection with FIG. 1, integrity plug-in proxy 130 may wait until all integrity results 150 are received from remote integrity servers 110 before providing a recommendation/result to network access authority 120. In one example, if integrity plug-in proxy 130 does not receive integrity results from a particular remote integrity server 110, integrity plug-in proxy 130 may provide a recommendation/result to network access authority 120 based on the received integrity results. In another example, integrity plug-in proxy 130 may provide a recommendation/result for a single integrity policy once the integrity results related to the single integrity policy are received from one or more remote integrity servers 110. In still another example, integrity plug-in proxy 130 may provide more than one access recommendation or more than one integrity result based on the collated integrity results.

FIG. 7 depicts a flowchart of an exemplary process 700 capable of being performed by network access authority 120. As shown, process 700 may begin with receipt of user data associated with a user requesting access to a resource protected by a network access authority (block 710). For example, in one implementation described above in connection with FIG. 4, policy creator 400 of network access authority 120 may receive request/user data 140 (e.g., from user device 105) requesting access to a resource protected by network access authority 120.

Process 700 may continue with generation of integrity policies based on the received user data (block 720). For example, in one implementation described above in connection with FIG. 4, policy creator 400 of network access authority 120 may generate a variety of integrity policies 330 associated with user data 320. For example, policy creator 400 may create a first set of one or more integrity policies 330 regarding resource access, which may be provided to a first remote integrity plug-in 115 associated with a first remote integrity server 110. Policy creator 400 may create a second set one or more integrity policies 330 regarding resource access, which may be provided to a second remote integrity plug-in 115 associated with a second remote integrity server 110. Policy creator 400 may further create, for example, an overall policy that may grant resource access if the first and second sets of integrity policies 330 are achieved.

As further shown in FIG. 7, the user data and/or the integrity policies may be provided to an integrity plug-in proxy (block 730). For example, in one implementation described above in connection with FIG. 4, policy creator 400 may provide user data 320 and/or integrity policies 330 to integrity plug-in proxy 130, and integrity plug-in proxy 130 may manage distribution of user data 320 and/or integrity policies 330 to remote integrity servers 110.

An access recommendation and/or a single integrity result may be received from the integrity plug-in proxy (block 740). For example, in one implementation described above in connection with FIG. 4, access determiner 410 of network access authority 120 may receive an integrity recommendation and/or a single integrity result (e.g., incorporating integrity results 150) from integrity plug-in proxy 130, and may use the recommendation/result to determine whether to grant or deny access to an endpoint (e.g., user device 105).

As further shown in FIG. 7, the user may be granted or denied access based on the access recommendation and/or the single integrity result (block 750). For example, in one implementation described above in connection with FIG. 4, access determiner 410 may provide signal 155 (e.g., based on the integrity recommendation or the single integrity result) to user device 105 indicating whether resource access is granted or denied for user device 105.

CONCLUSION

Systems and methods described herein may assign integrity policies for evaluation to remote integrity servers, may collate the results from the remote integrity servers, and may provide an integrity recommendation and/or a single integrity result based on the collated results. For example, in one implementation, a user device may collect integrity information and may provide this information to a network access authority when requesting access to a resource. The network access authority may identify integrity policies for analyzing the integrity information, and may provide the integrity policies to an integrity plug-in proxy associated with the network access authority. The integrity plug-in proxy may assign the integrity policies to one or more remote integrity servers. Remote integrity plug-ins associated with the remote integrity servers may check the integrity information against the integrity policies, and the remote integrity servers may provide results of the check to the integrity plug-in proxy. The integrity plug-in proxy may collate the results and may provide an integrity recommendation or a single integrity result to the network access authority. The network access authority may grant or deny resource access to the user device based on the integrity recommendation and/or the single integrity result.

The foregoing description provides illustration and description, but is not intended to be exhaustive or to limit the embodiments to the precise form disclosed. Modifications and variations are possible in light of the above teachings or may be acquired from practice of the invention.

For example, while series of acts have been described with regard to the flowcharts of FIGS. 6 and 7, the order of the acts may differ in other implementations. Further, non-dependent acts may be performed in parallel.

Embodiments, as described above, may be implemented in many different forms of software, firmware, and hardware in the implementations illustrated in the figures. The actual software code or specialized control hardware used to implement embodiments described above is not limiting of the invention. Thus, the operation and behavior of the embodiments were described without reference to the specific software code—it being understood that one would be able to design software and control hardware to implement the embodiments based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed:

1. A method comprising:
   receiving, by a device, user data associated with a user device,
      the user data including integrity information, associated with the user device, that is received from one or more integrity plug-ins associated with the user device,
      the device being different than the user device;
   generating, by the device and based on the received user data, a plurality of integrity policies,
      each of the plurality of integrity policies being associated with a respective rule for accessing, by the user device, a resource,
         each respective rule, associated with each of the plurality of integrity policies, being different;
   parsing, by the device, each of the plurality of integrity policies to determine a type of the respective rule associated with each of the plurality of integrity policies;
   determining, by the device and based on each determined type of respective rule, a remote integrity server, of a plurality of remote integrity servers, associated with processing each determined type of respective rule;
   distributing, by the device, information identifying at least one respective rule and a portion of the user data corresponding to the at least one respective rule to at least one of the plurality of remote integrity servers based on at least one function performed by each of the plurality of remote integrity servers,
      the portion of the user data being a subset of the user data and including a portion of the integrity information;
   receiving, by the device, one or more integrity results from the at least one of the plurality of remote integrity servers based on the portion of the user data and the at least one respective rule,
      at least one of the one or more integrity results indicating whether to grant or deny access, to the resource, by the user device; and
   formulating, by the device and based on the one or more integrity results, at least one of an access recommendation or an overall integrity result for the user device.

2. The method of claim 1, further comprising:
   determining whether to grant or deny access to the user device based on the at least one of the access recommendation or the overall integrity result.

3. The method of claim 1, where generating the plurality of integrity policies comprises:
   receiving one or more integrity policies for analyzing the integrity information.

4. The method of claim 1, where generating the plurality of integrity policies comprises:
   receiving one or more integrity policies that include a condition for the user device to access a protected resource.

5. The method of claim 1, where distributing the information identifying the at least one respective rule and the portion of the user data corresponding to the at least one respective rule comprises:
   distributing the information identifying the at least one respective rule and the portion of the user data based on a portion of the plurality of integrity policies.

6. The method of claim 1, where receiving the one or more integrity results comprises:
   receiving the one or more integrity results from one or more remote integrity plug-ins associated with a respective one of the plurality of remote integrity servers.

7. The method of claim 1, where formulating the at least one of the access recommendation or the overall integrity result further comprises:
   formulating the at least one of the access recommendation or the overall integrity result to facilitate determination of whether to grant or deny access to the user device.

8. The method of claim 1, where the device comprises a network access authority device.

9. The method of claim 1, further comprising:
   granting or denying access, by the user device, to the resource based on the at least one of the access recommendation or the overall integrity result.

10. The method of claim 1, where formulating the at least one of the access recommendation or the overall integrity result further comprises:
   formulating the at least one of the access recommendation or the overall integrity result for a single integrity policy of the plurality of integrity policies.

11. A method comprising:
   receiving, by a device, user data associated with a user device requesting access to a resource,
      the user data including integrity information, associated with the user device, that is received from one or more integrity plug-ins associated with the user device,
      the device being different than the user device;
   generating, by the device, a plurality of integrity policies based on the received user data,
      each of the plurality of integrity policies being associated with a respective rule for accessing the resource,
         each respective rule being different;
   providing, by the device, the user data and the plurality of integrity policies to an integrity plug-in proxy of the device;
   parsing, by the integrity plug-in proxy, each of the plurality of integrity policies to determine a type of the respective rule associated with each of the plurality of integrity policies;
   determining, by the integrity plug-in proxy and based on each determined type of respective rule, a remote integrity server, of a plurality of remote integrity servers, associated with processing each determined type of respective rule;
   distributing, by the integrity plug-in proxy, information identifying at least one respective rule and a portion of the user data corresponding to the at least one respective rule to at least one of the plurality of remote integrity servers based on at least one function performed by each of the plurality of remote integrity servers,
      the portion of the user data being a subset of the user data and including a portion of the integrity information,
   receiving, by the integrity plug-in proxy, one or more integrity results from the at least one of the plurality of remote integrity servers based on the portion of the user data and the at least one respective rule,
      at least one of the one or more integrity results indicating whether to grant or deny access, to the resource, by the user device;

receiving, by the device, an access recommendation or an overall integrity result from the integrity plug-in proxy based on the received one or more integrity results; and granting or denying, by the device, access to the user device based on the access recommendation or the overall integrity result.

12. The method of claim 11, where generating the plurality of integrity policies comprises:

generating one or more integrity policies, of the plurality of integrity policies, that include a condition for the user device to access the resource.

13. The method of claim 11, where each of the respective rules comprises:

at least one rule to examine the user device and prohibit the user device from accessing the resource when the user device is unsafe or non-compliant.

14. The method of claim 11, where the device comprises a network access authority device.

15. The method of claim 11, where granting or denying access to the user device comprises:

granting access to the user device when the user device is determined to be trustworthy based on the access recommendation or the overall integrity result.

16. The method of claim 11, where granting or denying access to the user device comprises:

denying access to the user device when the user device is determined to be untrustworthy based on the access recommendation or the overall integrity result.

17. A device comprising:

a memory to store a plurality of instructions; and a processor to execute the plurality of instructions in the memory to:

receive user data associated with a user device requesting access to a resource, the user data including integrity information, associated with the user device, that is received from one or more integrity plug-ins associated with the user device;

generate a plurality of integrity policies based on the user data, each of the plurality of integrity policies being associated with a respective rule for accessing the resource, each respective rule, associated with each of the plurality of integrity policies, being different;

parse each of the plurality of integrity policies to determine a type of the respective rule associated with each of the plurality of integrity policies;

determine, based on each determined type of respective rule, a remote integrity server, of a plurality of remote integrity servers, associated with processing each determined type of respective rule;

distribute information identifying at least one respective rule and a portion of the user data corresponding to the at least one respective rule to at least one of the plurality of remote integrity servers based on at least one function performed by each of the plurality of remote integrity servers, the portion of the user data being a subset of the user data and including a portion of the integrity information;

receive integrity results from the at least one of the plurality of remote integrity servers based on the portion of the user data and the at least one respective rule, at least one of the integrity results indicating whether to grant or deny access, to the resource, by the user device;

collate the integrity results; and formulate an access recommendation or an overall integrity result for the user device based on the collated integrity results.

18. The device of claim 17, where the processor is further to:

receive one or more integrity policies for analyzing the integrity information.

19. The device of claim 17, where the processor is further to:

receive one or more integrity policies that include a condition for the user device to access the resource.

20. The device of claim 17, where the processor is further to:

receive the integrity results from one or more remote integrity plug-ins associated with each of the plurality of remote integrity servers.

21. The device of claim 17, where the processor, when formulating the access recommendation or the overall integrity result, is further to:

formulate the access recommendation or the overall integrity result for multiple, different integrity policies.

22. The device of claim 17, where the processor, when formulating the access recommendation or the overall integrity result, is further to:

formulate the access recommendation or the overall integrity result to facilitate determination of whether to grant or deny the user device access to the resource.

23. The device of claim 17, where the processor, when formulating the access recommendation or the overall integrity result, is further to:

formulate the access recommendation or the overall integrity result for a single integrity policy.

24. The device of claim 17, where the processor is further to:

grant or deny access, by the user device, to the resource based on formulating the access recommendation or the overall integrity result.

25. A non-transitory computer-readable medium storing instructions, the instructions comprising:

one or more instructions which, when executed by a device, cause the device to:

receive user information associated with a user device requesting access to a protected resource, the user information including integrity information, associated with the user device, that is received from one or more integrity plug-ins associated with the user device;

generate a plurality of integrity policies based on the user information, each of the plurality of integrity policies being associated with a respective rule for accessing, by the user device, the protected resource, each respective rule, associated with each of the plurality of integrity policies, being different;

parse each of the plurality of integrity policies to determine a type of the respective rule associated with each of the plurality of integrity policies;

determine, based on each determined type of respective rule, a remote integrity server, of a plurality of remote integrity servers, associated with processing each determined type of respective rule;

distribute information identifying at least one respective rule and a portion of the user information corresponding to the at least one respective rule to at least one of the plurality of remote integrity servers based on at least one function performed by each of the plurality of remote integrity servers, the portion of the user information being a subset of the user information and including a portion of the integrity information;

receive integrity results from the at least one of the plurality of remote integrity servers based on the portion of the user information and the at least one respective rule, at least one of the integrity results indicating whether to grant or deny access, to the protected resource, by the user device;

collate the integrity results to determine an access recommendation or an overall integrity result; and grant or deny the user device access to the protected resource based on the access recommendation or the overall integrity result.

26. The medium of claim 25, where the one or more instructions to generate the plurality of integrity policies further comprise:

one or more instructions to generate integrity policies, of the plurality of integrity policies, that include a condition for the user device to access the protected resource.

27. The medium of claim 25, where each of the respective rules comprises:

at least one rule to examine the user device and prohibit the user device from accessing the protected resource when the user device is unsafe or non-compliant.

28. The medium of claim 25, further comprising:

one or more instructions to receive the access recommendation or the overall integrity result for a single integrity policy.

29. The medium of claim 25, where the one or more instructions to grant or deny the user device access to the protected resource further comprise:

one or more instructions to grant the user device access to the protected resource when the user device is determined to be trustworthy based on the access recommendation or the overall integrity result.

30. The medium of claim 25, where the one or more instructions to grant or deny the user device access to the protected resource further comprise:

one or more instructions to deny the user device access to the protected resource when the user device is determined to be untrustworthy based on the access recommendation or the overall integrity result.

31. The medium of claim 25, where the one or more instructions to collate the integrity results to determine an access recommendation or an overall integrity result further comprise:

one or more instructions to collate the access recommendation or the overall integrity result for multiple, different integrity policies of the plurality of integrity policies.

* * * * *